United States Patent [19]
Hansen et al.

[11] Patent Number: 6,094,417
[45] Date of Patent: Jul. 25, 2000

[54] METHOD AND SYSTEM FOR DETERMINING OPTIMIZED SONET RINGS

[75] Inventors: Ronald L. Hansen, Louisville; Jennifer Sanchez, Nederland, both of Colo.

[73] Assignee: U S West, Inc., Denver, Colo.

[21] Appl. No.: 09/203,139

[22] Filed: Dec. 1, 1998

[51] Int. Cl.[7] .................................................... H04J 3/00
[52] U.S. Cl. .............................................................. 370/222
[58] Field of Search .................................. 370/222, 223, 370/258, 402, 404, 405, 406, 424, 452, 460, 389, 399, 397, 351, 352, 216, 224–229, 395, 403, 408, 252, 907, 906, 905, 909, 535, 537, 465; 359/114, 118, 119, 124; 340/825.01, 827; 379/221

[56] References Cited

U.S. PATENT DOCUMENTS

| | | | |
|---|---|---|---|
| 5,412,652 | 5/1995 | Lu | 370/223 |
| 5,515,367 | 5/1996 | Cox, Jr. et al. | 370/404 |
| 5,564,021 | 10/1996 | Qiu et al. | |
| 5,729,692 | 3/1998 | Qiu et al. | 370/222 |
| 5,742,605 | 4/1998 | Norman, Jr. | 370/405 |
| 5,742,774 | 4/1998 | Al-Salameh et al. | 370/401 |
| 5,774,689 | 6/1998 | Curtis et al. | 370/351 |
| 5,867,502 | 2/1999 | Chang | 370/477 |

*Primary Examiner*—Dang Ton
*Attorney, Agent, or Firm*—Brooks & Kushman, P.C.

[57] ABSTRACT

A SONET planning tool is provided for generating optimized SONET rings based on an existing SONET system capacity and anticipated system demand at minimal cost. The planning tool includes an analytical process that accurately models and utilizes embedded systems, linear chains, unidirectional rings, and bi-directional rings based on existing capabilities. In addition, large forecasted demands can be preprocessed with dedicated two-node rings, and multi-period studies can be generated.

13 Claims, 6 Drawing Sheets

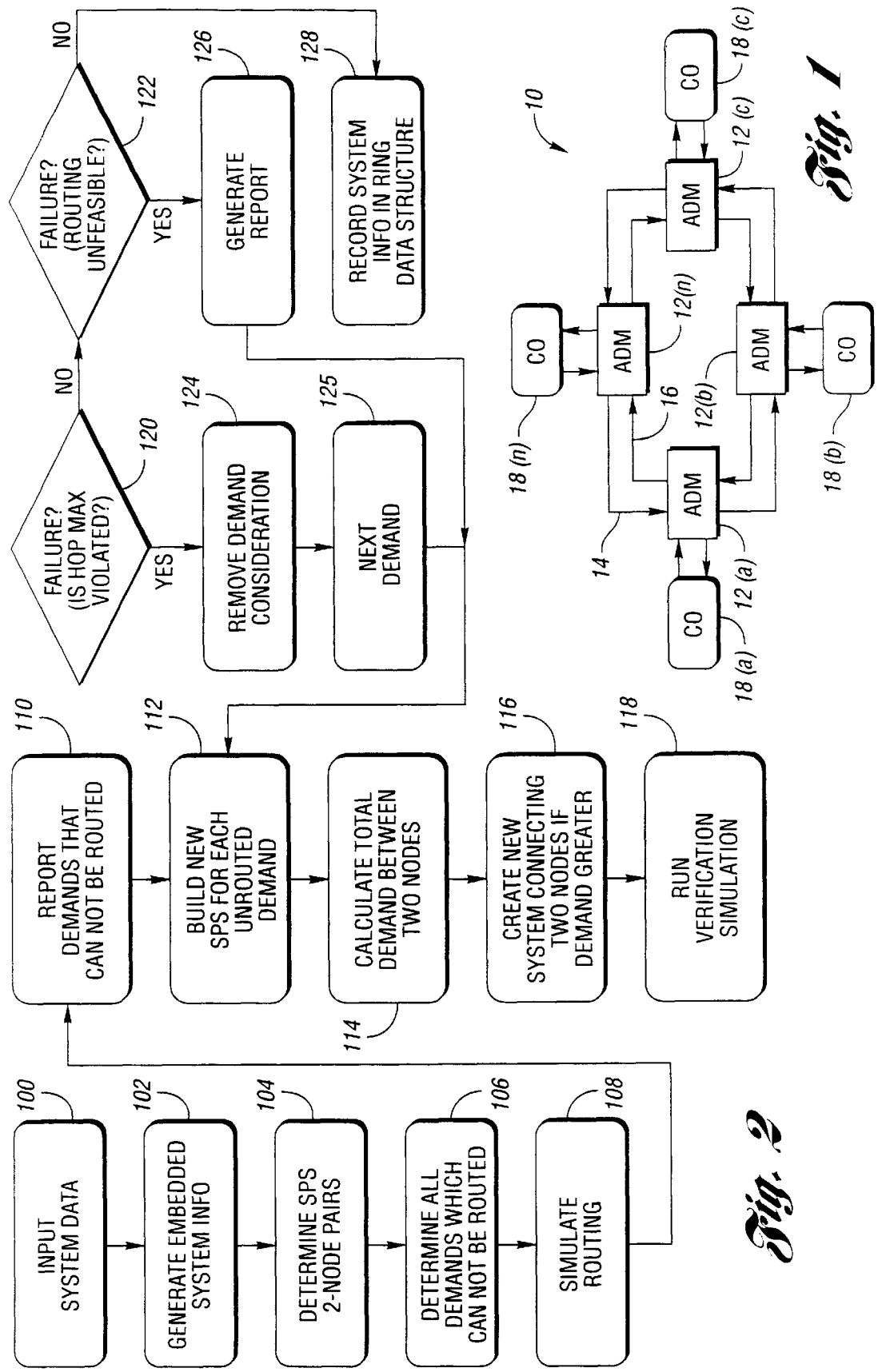

METHOD AND SYSTEM FOR DETERMINING OPTIMIZED SONET RINGS

TECHNICAL FIELD

The present invention relates generally to Synchronous Optical Networks (SONETs), and more particularly, to a method and system for determining optimal SONET rings.

BACKGROUND ART

Generally, a Synchronous Optical Network (SONET) is both a standard and a set of specifications for building high speed, digital communications networks that run over fiberoptic cables while interfacing with existing electrical protocols and asynchronous transmission equipment. Such networks facilitate cutting of operating costs for regional telephone networks, while also upgrading existing networks, providing new high speed services, and interconnecting of the regional telephone network to long-distance companies and international carriers. The use of fiberoptics in such networks provides a dramatic increase in available bandwidth (currently estimated in the hundreds of gigabits per second).

One of the principal benefits of SONET is that it allows for the direct multiplexing of current network services, such as DS1, DS1C, DS2, and DS3 into the synchronous payload of Synchronous Transport Signals (STS). The STS provide an electrical interface which is used as a multiplexing mechanism within SONET Network Elements (NE). The SONET multiplexing format provides greater capacity and efficiency over traditional asynchronous arrangements. For example, in the SONET multiplexing format, the basic signal transmission rate, i.e., STS-1, operates at 51.84 million bits per second. AN STS-1 can carry 28 DS1 signals or one asynchronous DS3. STS-1 signals are then multiplexed to produce higher bit rates STS-2, STS-3, etc. SONET signal levels are also defined in terms of an optical carrier (OC). Since the bit rates are the same in each case, the bit rate of the STS-1 equals the bit rate of the OC-1 with the only difference relating to the type of signal that is being referenced. For example, if the signal is in an electrical format, it is referred to as an STS. Similarly, if the signal is in an optical format compatible with a fiber medium, the signal is referred to as an OC.

Because of the large bandwidth availability in fiber, and the growing volume of data traffic, disruptions from link and node failures due to cable cuts, for example, become increasingly serious. Network survivability has therefore become a major concern for SONET designers and has fueled interest in what is known in the art as "ring" architectures. Such architectures take advantage of the capability provided by synchronous multiplexing in SONET to eliminate the need to backhaul traffic to central hubs. Thus, at each switching office, the SONET transport node directly accesses the required time slots in the bit stream through the use of modified Add-Drop Multiplexers (ADM). The SONET ring topology permits the creation of highly survivable networks which are viewed in the communications industry as essential for obtaining business for critical data communications.

In most cases, the deployment of SONET rings results in cost savings since it is far less expensive for carriers to install a fiber ring then to deploy point-to-point links. Generally, ring topology routes working or service traffic in one direction only. If the utilized fiber fails, traffic is rerouted on a protection fiber and travels in the opposite direction. In this manner, working traffic bypasses the failure to reach the intended destination. In addition, bidirectional ADMs are also used to allow signals to be rerouted back through an ADM to reach a destination terminal.

One example of an arrangement for assigning inter-nodal traffic loads to channels in SONET rings is provided by commonly-owned U.S. Pat. No. 5,564,021 to Qiu et al. In this SONET planning arrangement, a mixed integer program (MIP) is used to model the cost of terminal multiplexers (TM), ADMs, and corresponding interface ports necessary to route the desired traffic loads. While such an arrangement improves traffic routing, a need exists for a SONET optimizing tool which provides even more accurate modeling and cost effective network demand assessment and management.

DISCLOSURE OF THE INVENTION

It is therefore an object of the present invention to provide a method and system for a SONET planning tool which determines near optimal SONET rings based on anticipated need and minimal cost.

In accordance with this and other objects, the present invention provides a method and system for determining near optimal SONET rings based on modeling existing system structure and costs associated with future demands. The least costly solutions are generated and reported based on the analysis of each demand. More specifically, the present invention provides a SONET planning tool that generates optimized SONET rings based on an existing SONET system capacity and anticipated system demand by determining existing two-node single path systems present in the SONET system, modeling the existing systems, and determining origin and destination nodes for each user demand. A simulated routing is then performed for each demand over the existing two-node single path systems to identify all demands that can be exclusively routed over an existing single path two-node pair. Any demand which can not be routed over an existing single path two-node pair is recorded, and a new single path two-node pair system is modeled for each demand which cannot be routed to identify a least costly solution or modification to the existing system. The process determines whether routing over the new single path system fails. In addition, data representative of the new single path two-node pair system is recorded into a ring data structure of the SONET system if routing of a demand was successful.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic diagram of a typical bi-directional SONET architecture;

FIG. 2 is a flow chart illustrating a first processing routine of the SONET planning tool of the present invention;

BEST MODES FOR CARRYING OUT THE INVENTION

Figure 3A:
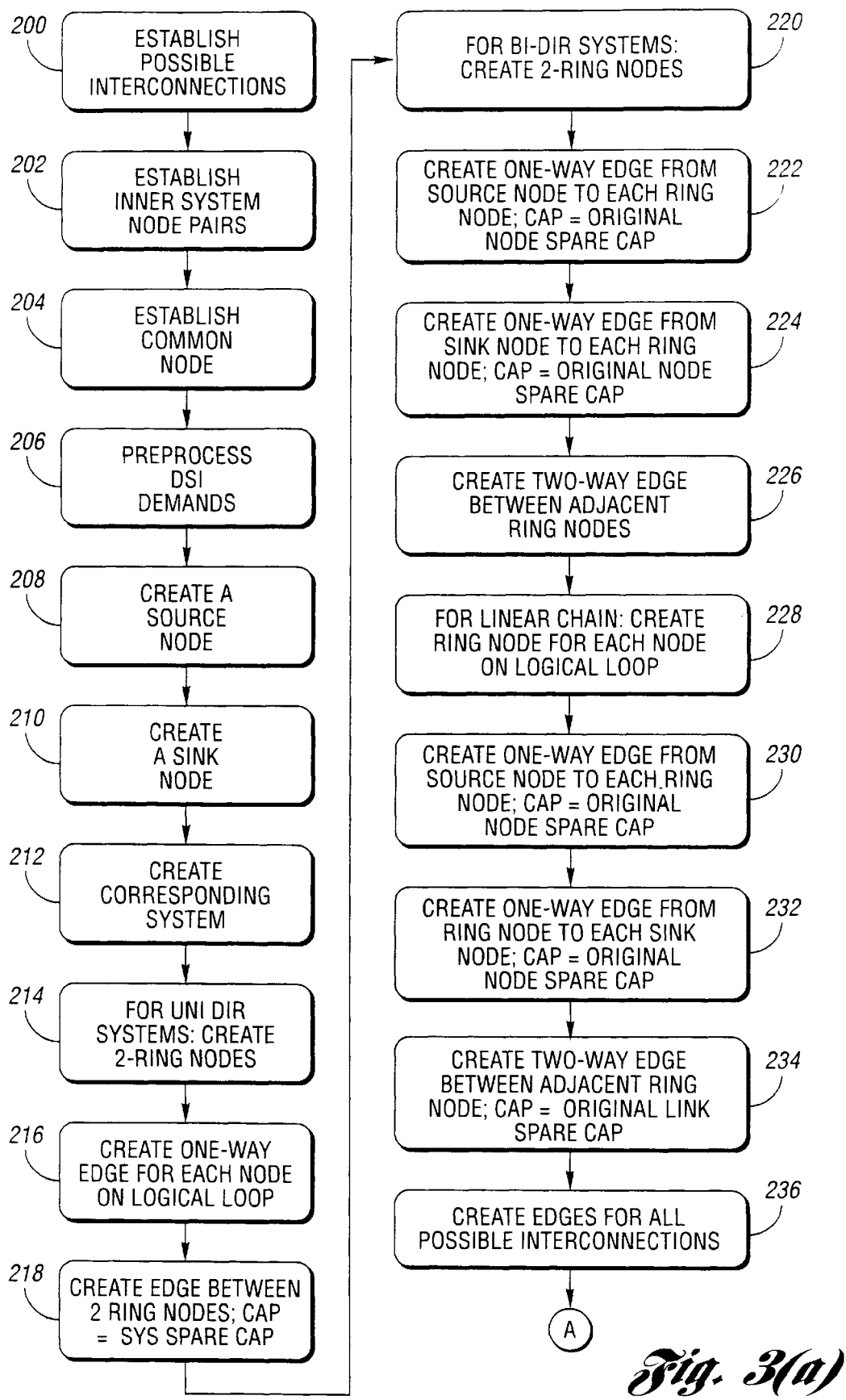
FIGS. 3(a) and 3(b) are a flowchart illustrating a further routine within the planning tool of the present invention for analyzing future demands.

In general, the present invention provides a SONET planning tool suitable for use with unidirectional or bidirectional ring arrangements. Referring to FIG. 1, a SONET ring architecture 10 is shown having a plurality of nodes represented by add/drop multiplexer (ADM) units 12(a)–12(n), which are all coupled to both a primary communication line 14 and a secondary "protection" communication line 16. It is noted that those skilled in the art will readily appreciate that ADM units 12 can be arranged to provide either unidirectional communication or bi-directional communication. In addition, for bi-directional communication, the one or more pairs of transmit and receive lines can be used to provide both the primary and secondary communication paths using appropriate switching systems. Each node is shown connected to a central office (CO) 18(a)–18(n) or hub. The operation of the various components in the SONET ring architecture 10 is generally understood to one skilled in the art, and except as described below, do not form a part of the present invention.

In accordance with the present invention, a SONET planning tool is provided as an algorithm routine carried out by a system overhead management processor. The planning tool allows analysis of physical attributes of an existing telecommunications network, as well as the costs associated with building new systems or adding to existing systems, and a list of point-to-point demands (which includes the type and amount of demands) over a number of time periods. This analysis allows the planning tool to determine whether the demands can be routed over an existing and/or planned network. Analysis of physical attributes includes processing information indicative of such factors as central office locations, the amount and location of spare fiber (or coaxial cable), and the size, location and spare capacities of existing systems. The planning tool of the present invention also allows analysis of a future year's potential demands to determine a least costly system capable of handling that demand. This analysis can include discounting for present value cost, thereby allowing a system to be built which will be provide the most cost effective expenditure capable of meeting future needs.

FIG. 2 provides a flowchart illustrating a first processing routine of the SONET planning tool of the present invention for creating single path systems (SPS). More specifically, various system data are initially accessed as inputs to the planning tool analysis routine as denoted at block 100. Such data includes system parameters, ADA Costs, node Information, demands, planned systems information, link information, and costs for fiber, regenerator, and interconnection systems. In addition, embedded systems information is generated at block 102 by verifying the order of each system from given link data, recording system, link & node capacities, and creating rings and loop carriers (LC), and placing the embedded systems before ring data structure.

At block 104, it is determined which two-node pairs meet SPS requirements to create single-path systems. This is accomplished by first identifying existing two-node systems, and determining origin and destination terminals for demands greater than a user defined threshold value. Then, as denoted at block 106, all demands that can be routed exclusively on a SPS are determined. At block 108, an attempt is made to route these demands on the SPS. As part of this process, system spare and working capacities are adjusted as the demands are routed, while those demands that cannot be routed on the existing SPS are tracked. A report is generated at block 110 for all demands that are not routed.

As denoted at block 112, a new SPS is built for those demands which were not routed. This process involves calculating (for each SPS demand) at block 114 the total demand between two nodes of the SPS, and creating a new system at block 116 connecting the two nodes when the SPS demand is greater than zero. At block 118, a verification simulation is run to determine whether or not routing over the created SPS would be successful. At block 120, if the routing failed, the routine determines whether the number of required loop hops exceeding a predetermined number or likewise if the failure was a result of unfeasibility at block 122. If there is a failure due to exceeding a predetermined number of hops, the current demand is removed from further consideration at block 124, a report is generated, and the next unrouted demand is processed. On the other hand, if failure was caused by unfeasibility of the routing, a report is generated and the analysis of the SPS is halted at block 126. As denoted at block 128, if the simulated routing was successful, the system information is then recorded in the ring data structure. The processed SPS demands are then removed from further consideration.

Figure 3B:
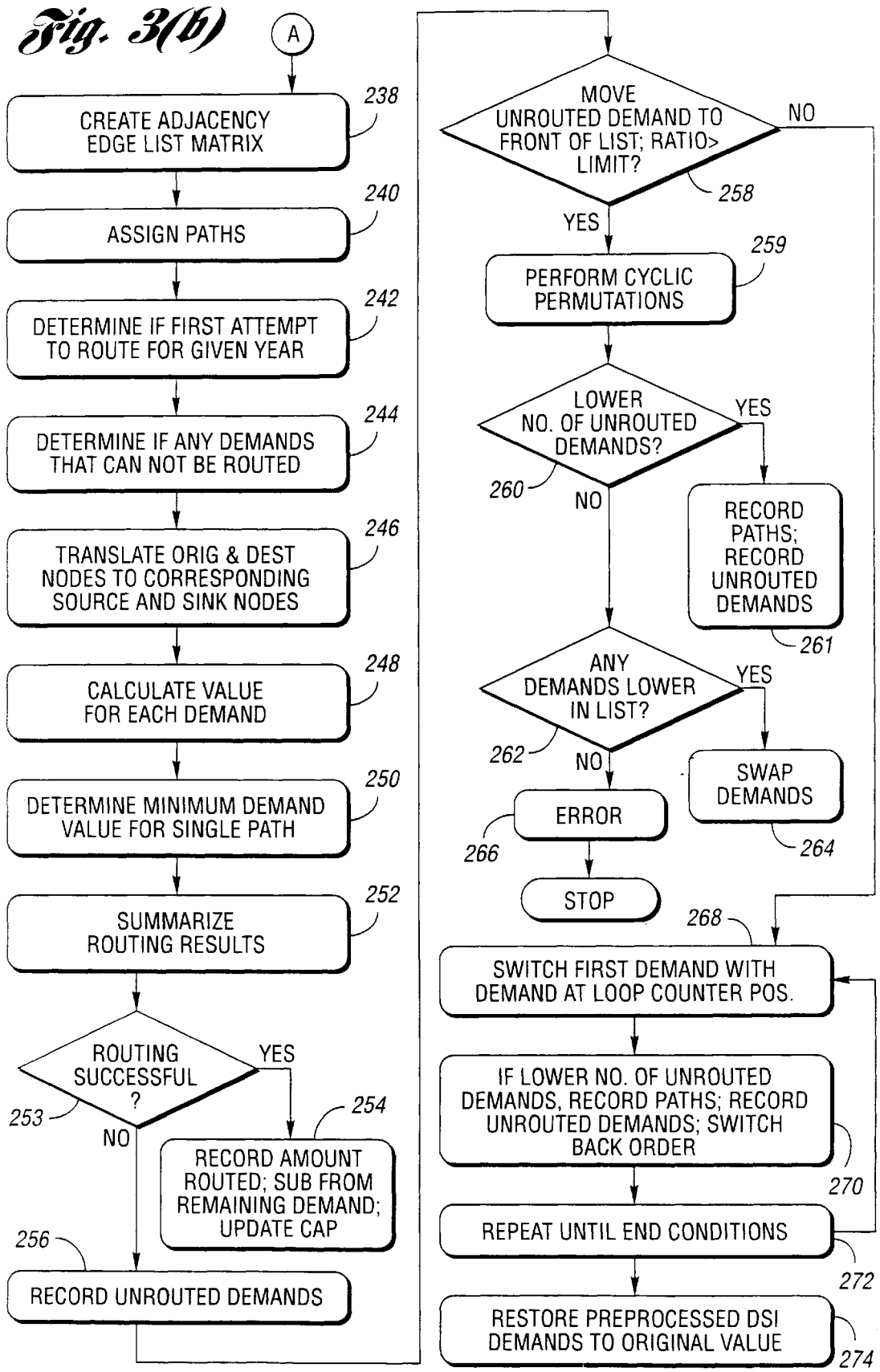

Referring now to FIG. 3, a flowchart illustrates a further routine within the planning tool of the present invention for allowing a user to determine all of the possible combinations for building a future year's demands in an earlier year, and reporting the least costly solution. This process simulates routing of demands from a given start year through a given end year in sequential order one year at a time. More specifically, for each year of the desired period, the demand year and actual year are used at block 200 to establish possible interconnections. For a modeled network, all node pairs are established at block 202 that can be interconnected from one system to another. At block 204, at least one node common to both systems is established.

DS1 demands are then preprocessed at block 206 by converting all DS1 traffic greater than a user supplied packing threshold to the next highest DS3. A "bogus" network is then setup as follows: for all nodes, create a source node at block 208 and a sink node at block 210; and for all systems, a corresponding system is created at block 212. For uni-directional systems, two ring nodes are created at block 214. Then for each node on the logical loop, a one-way edge is created as denoted by block 216 from the corresponding source node to the first ring node, with the capacity being equal to the original node's spare capacity. At block 218 an edge is created between the two ring nodes, with the capacity being equal to the system's spare capacity.

Likewise, for bi-directional systems, a ring node is created at block 220 for each node on the logical loop, along with a one-way edge from the corresponding source node to each ring node at block 222, where capacity is equal to the original node's spare capacity. At block 224, a one-way edge is created from each ring node to a corresponding sink node, with the capacity being equal to the original node's spare capacity. As denoted at block 226, a two-way edge is created between each adjacent pair of ring nodes, with the capacity being equal to the original link's spare capacity. For a two-node system, the spare capacities of each link must be summed and assigned to the single edge. For linear chains, a ring node is created at block 228 for each node on the logical loop. At block 230, a one-way edge is created from a corresponding source node to each ring node, with the capacity being equal to the original node's spare capacity. As denoted at block 232, a one-way edge is created from each ring node to a corresponding sink node, with the capacity being equal to the original node's spare capacity. With the exception that the last node will not be connected back to the first node, a two-way edge is created at block 234 between each adjacent pair of ring nodes, with the capacity being equal to the original link's spare capacity. A zero is assigned for the cost of all edges.

At block 236, appropriate edges are created for all possible interconnections. More specifically, for unidirectional to unidirectional (including linear chains) and unidirectional to bi-directional connections, a one-way edge is created connecting from each of the two corresponding ring nodes. For bi-directional to bi-directional connections, a two-way edge is created connecting from each of the two corresponding ring nodes. In all cases, the capacity of all edges is set as being unlimited, and the cost of all edges is made equal to a corresponding user supplied interconnection cost. An adjacency edgelist matrix is then created as denoted at block 238.

At block 240, paths are assigned for routing all demands. At block 242, the process determines if this is the first attempt to route given year's demands. If so, it is determined at block 244 if there are any demands that cannot be routed given a set of user defined constraints. At block 246, all demands are then analyzed and the demand origin and destination translated to the bogus network's corresponding source and sink nodes, respectively. At block 248, the value of each demand is generated including calculating a correct equivalent DS1 amount.

At block 250, while a demand still remains to be routed, the process determines a minimum demand amount that can be routed in a single path. This includes finding the shortest path for each node and each edge, and determining the amount of the demand that can be correspondingly routed through the node or along the edge, respectively. At block 252, the amount of demand routed, the routing path, and whether the routing was entirely successful is summarized. In addition, if the routing was successful (block 253), at block 254 the amount routed is subtracted from the demand remaining, and the capacities consumed along the path are updated. On the other hand, if the routing was not successful, the demands that were unrouted are recorded at block 256. In addition, the total number of unrouted demands is summarized.

If all the demands were not routed, the process performs a search array subroutine denoted starting at block 258 by moving unrouted demands to the front of the demand list and determining whether unrouted demands/total demands ratio exceeds defined limit. If the limit is exceeded, a demand cut process is executed at block 259 by performing a cyclic permutation for all demands as a result of moving the first demand in the list to the rear of the list and evaluating the results of each move. At block 260, if a lower number of unrouted demands were found by the move, the number of unrouted demands and the paths for the demands that were routed are recorded at block 261.

At block 262, if a lower number of unrouted demands are found in the list of demands, those demands lower in a demand index of the demand that yielded the lowest number of unrouted demands are swapped with the demands higher in the demand index at block 264. Otherwise, an error is reported at block 266 and the subroutine stopped.

On the other hand, if the unrouted demands/total demands ratio limit was not exceeded at block 258, a demand move process is executed at block 268 by switching the first demand in list with the demand located on the list at a position indicated by a search loop counter, and evaluating each move. At block 270, if a lower number of unrouted demands found, then the number of unrouted demands and paths for the demands that were routed are recorded. The two demands are then switched back in the list. As indicated at block 272, this process of searching for a lower number of unrouted demands is repeated until the number of unrouted demands equals zero, the number of evaluations attempted is too great and the ratio of unrouted demands/total Number demands is greater than ratio limit, or the number of evaluations attempted is too great and the number of unrouted demands is too great. At block 274, all preprocessed DS1 demands are restored by converted back to their original DS1 value.

Figure 4A:
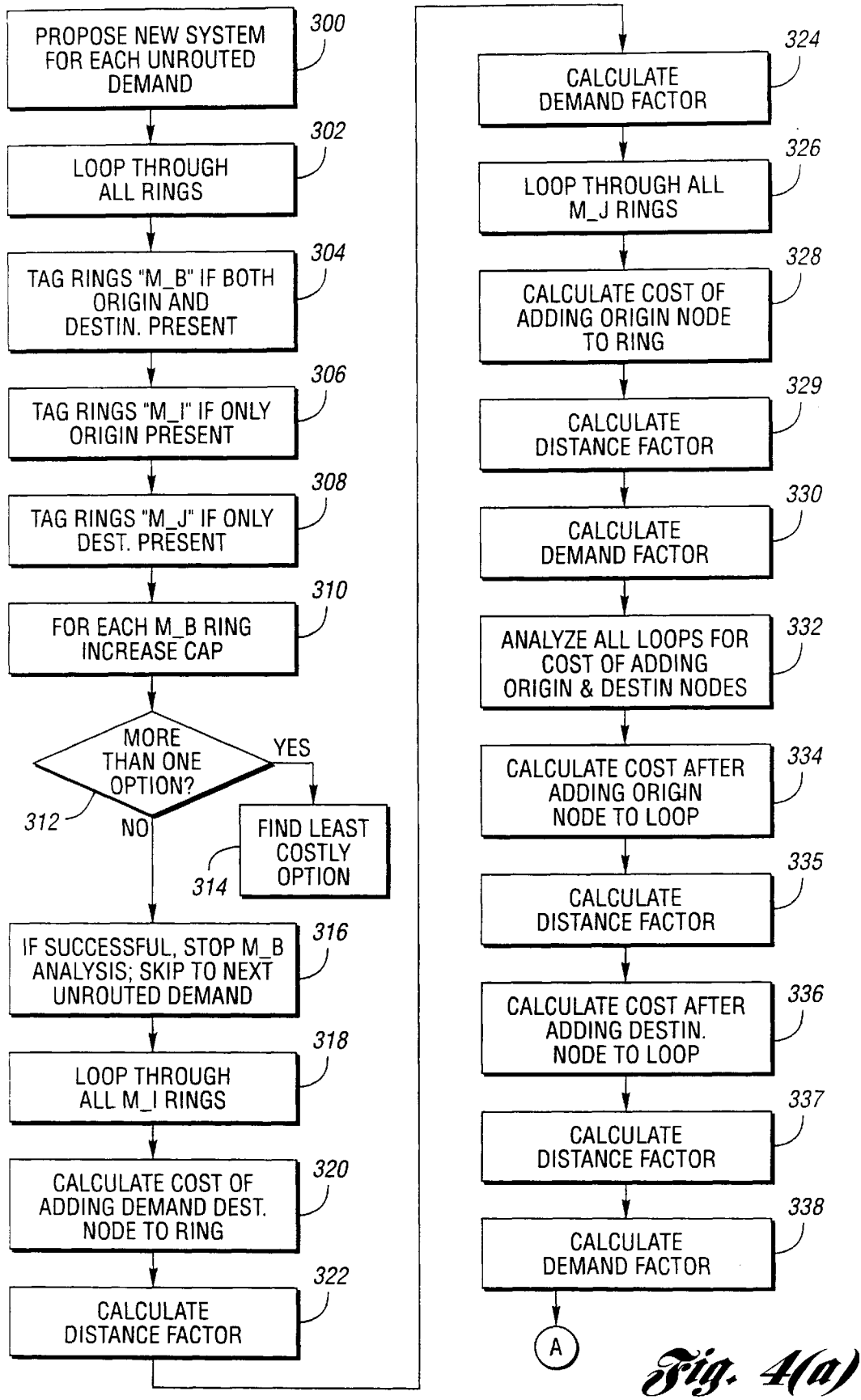
FIGS. 4(a) and 4(b) are a flowchart illustrating a subroutine within the planning tool of the present invention for processing the results of the routing phase.
Figure 4B:
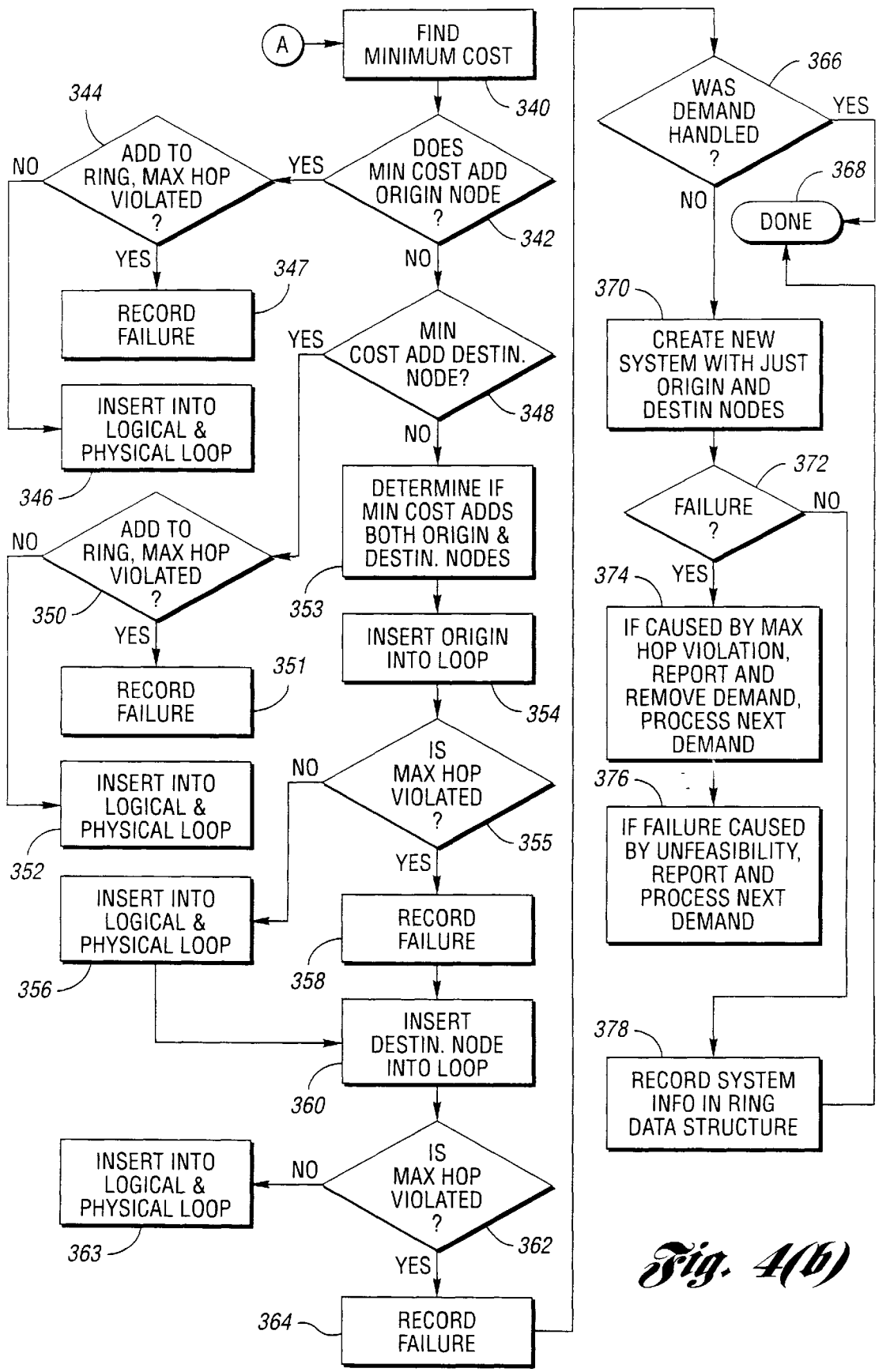

Referring now to FIG. 4, a flowchart illustrates the manner in which the planning tool of the present invention processes the results of the above-described routing phase. As denoted at block 300, a new system is proposed for each unrouted demand. More specifically, at block 302, the process loops through all rings and tags a ring M_B at block 304 if both the demand origin and destination nodes are present. On the other hand, a ring is tagged M_1 at block 306 if only the origin is present, or M_J at block 308 if only the destination is present.

As denoted at block 310, each M_B ring is analyzed by first increasing the capacity of the ring. This is accomplished by determining all of the demand currently routed on the ring, and calculating the minimum ring capacity needed to handle both the current demands and the unrouted demand. For a unidirectional ring, the unrouted demand is simply added to the system's current demand and the total then compared to the capacity of the new system. For a bi-directional ring, the unrouted demand is added to the system's current demand, followed by recursive attempts to route the total traffic on the increased capacity system. At block 312, if more than one option is found, i.e., there exists a minimum capacity unidirectional ring and/or a minimum capacity 2-fiber bi-directional ring and/or a minimum capacity 4-fiber bi-directional ring, the least costly option is determined and used as denoted at block 314. At block 316, if the loop processing was successful, the process ceases to continue looping through M_B loops and advances to the next unrouted demand.

As denoted at block 318, all M_I rings are likewise analyzed. Initially, at block 320, the process calculates the cost of adding the demand's destination node to the ring. A distance factor is then calculated after adding the destination node to the ring at block 322. In adding the destination node to the ring, a cost of zero is recorded if the destination node is already on the physical loop. Otherwise, for each pair of adjacent nodes on the logical loop, the two shortest paths are found the destination node inserted therein, and the cost of the least costly insertion point recorded. A demand factor is also calculated at block 324. This process calls for looping through all demands and recording the total demand value for all demands which would have their origin and destination contained on this ring if the destination node in question were added to the ring.

At block 326, the process loops through all M_J rings. The cost is calculated for adding origin node of the demand by computing the distance and demand factors. More specifically, at block 328 the cost of adding the origin node to the ring is calculated, and the distance factor is calculated at block 329. If the origin node is already on the physical loop, a cost of zero is recorded. Otherwise for each pair of adjacent nodes on the logical loop, the two shortest paths are found to insert the origin node, and the cost of the least costly insertion point is recorded. The demand factor is calculated at block 330 by looping through all demands and recording the total demand value for all demands which would have their origin and destination contained on the ring after the origin node were added.

As denoted at block 332, all loops are then analyzed to calculate the cost of adding both the demand's origin and destination nodes. First, the cost is calculated for adding the origin node to the loop being analyzed at block 334. If the origin node is already on the physical loop, a cost of zero is recorded. Otherwise, for each pair of adjacent nodes on the logical loop, the two shortest paths are found for inserting the origin node. The cost of the least costly insertion point is then recorded. The distance factor is calculated as denoted at block 335. Then at block 336, the destination node is added to the loop. If the destination node is already on the physical loop, a cost of zero is recorded. Otherwise, for each pair of adjacent nodes on the logical loop, the two shortest paths are found for insertion of the destination node. Again, the cost of the least costly insertion point is recorded and the distance factor is calculated as denoted at block 337. At block 338, the demand factor is calculated by looping through all demands and recording the total demand value for all demands that have their origin and destination nodes contained on the if both the origin and destination nodes were added.

Then, all calculated costs are processed at block 340 to find the minimum cost. If the minimum cost adds the origin node as determined at block 342, the node is added to the ring, and a check is made at block 344 to determine whether a maximum user defined hop constraint supplied has been violated. If not, the origin node is inserted into both the physical loop and the logical loop at block 346. Otherwise a failure is recorded at block 347.

If the minimum cost adds the destination node at block 348, the node is added to the ring, and a check is made at block 350 to determine whether a maximum user defined hop constraint supplied has been violated. If not, the destination node is inserted into both the physical loop and the logical loop at block 352. Otherwise a failure is recorded at block 351.

If the minimum cost adds both the origin and destination nodes, both nodes are added to the ring and each addition individually analyzed as denoted at block 353. In other words, for each pair of adjacent nodes on the logical loop, the two shortest paths are found to insert first the origin node at block 354. If both paths exist, a check is made at block 355 to determine whether the user defined maximum hops constraint is violated by insertion of the origin node. If not, the origin node is inserted in the physical and logical loops at block 356. Otherwise a failure is recorded at block 358. This process is repeated at blocks 360–364 for the destination node.

If the analysis is successful, i.e., the demand was "handled" as indicated at block 366, the calculated cost subroutine is ended at block 368 and the next unrouted demand is processed. If no additions can be made, a new system is created at block 370 which only connects the demand's origin and destination nodes. The new loop is simulated to determine whether there are any failures as denoted at block 372. At block 374, if a failure is caused as result of the user defined maximum hop constraint being violated, the failure is recorded and the demand is removed from further consideration. On the other hand, if a failure is caused by unfeasibility, the failure is also recorded at block 376. If the run is successful, the system information is recorded in the rings data structure as denoted at block 378.

Figure 5:
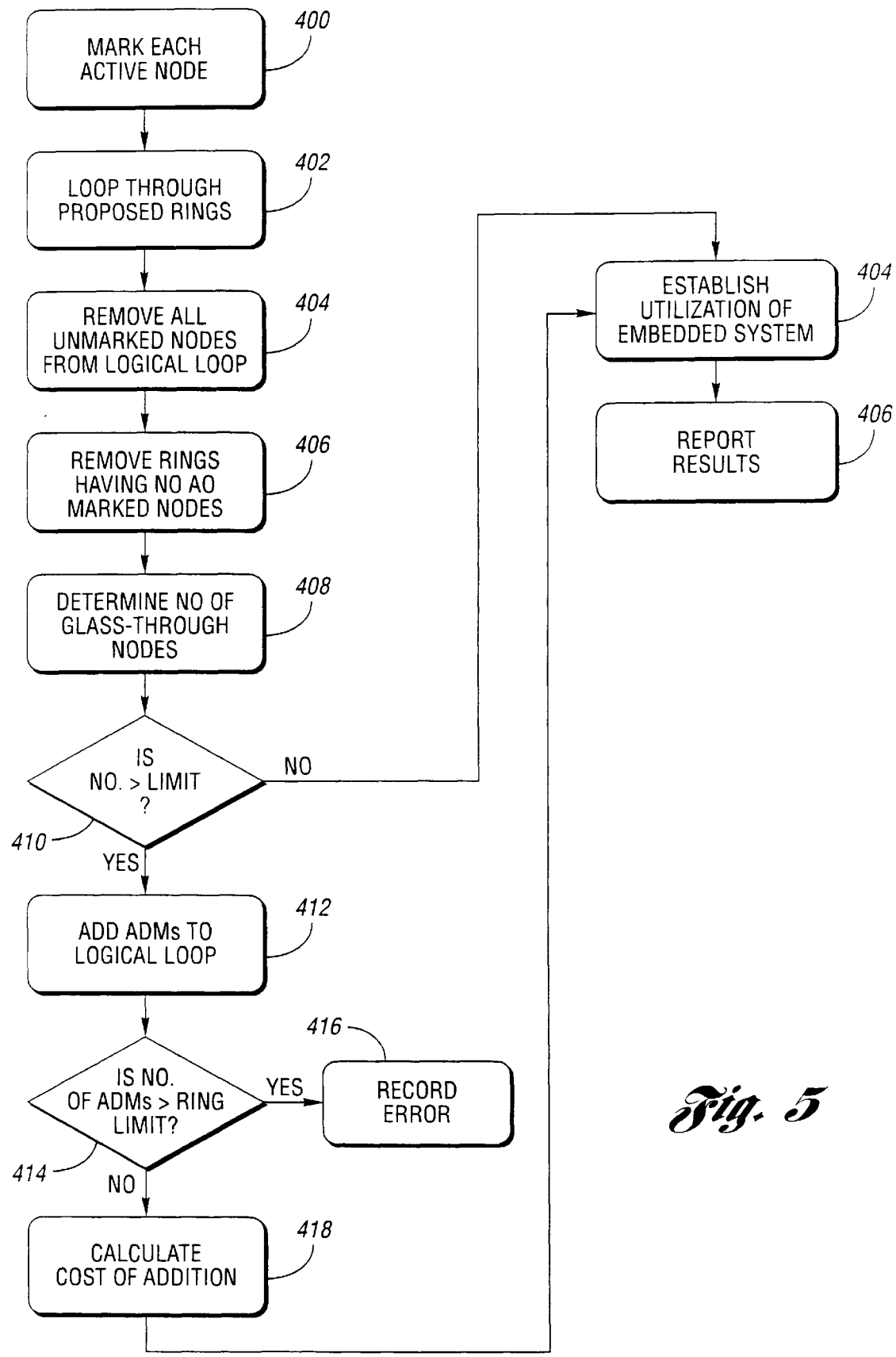
FIG. 5 is a flowchart illustrating a subroutine within the planning tool of the present invention for finding obsolete nodes within the least costly network.

FIG. 5 provides a flowchart illustrating a subroutine within the planning tool of the present invention for finding obsolete nodes within the least costly network. This process is arranged to analyze a period of time covering a specified start year through a specified end year. At block 400, each active node used to route a demand is marked, including a demand's origin node and destination node, as well as all interconnecting nodes on all rings. At block 402, the process loops through the proposed rings, and all nodes that are not marked are removed from the ring's logical loop at block 404. All rings that no longer contain a node are removed at block 406.

As denoted at block 408, for each pair of adjacent nodes, the number of glass-through nodes on the physical loop are determined. If the number is greater than a user defined limit as determined at block 410, an ADM node is added to the logical loop at block 412. If this addition causes the number of ADMs to become greater than the user-defined limit for this ring as determined at block 414, an error is recorded at block 416. Otherwise, the cost of the addition is calculated at block 418. More specifically, the ADM unit costs are assigned to the proper year. Then, based on a year by year and routed path analysis, the port/plug-in costs are calculated with the SPS demands being processed separately. Finally, fiber, regenerator, and interconnection costs are separately calculated. At block 420, the utilization of embedded systems is established including utilization imposed by all demands. The results of this analysis are then reported at block 422.

Therefore, the present invention provides a comprehensive SONET tool which can plan near optimal SONET rings capable of satisfying forecasted demand for a minimal total cost. The present invention also provides a process for accurately modeling and utilizing embedded systems using existing capabilities. In addition, linear chains, unidirectional rings, and bi-directional rings are accurately modeled, and large forecasted demands can be preprocessed with dedicated two-node rings. Finally, the present invention advantageously allows a fill rate to be set for ring capacities, and the generation and reporting of multi-period studies.

While the best mode for carrying out the invention has been described in detail, those familiar with the art to which this invention relates will recognize various alternative designs and embodiments for practicing the invention as defined by the following claims.

What is claimed is:

1. A method for generating optimized SONET rings based on an existing SONET system capacity and anticipated system demand comprising:

determining existing two-node single path systems present in the existing SONET system;

modeling the existing two-node single path systems;

determining origin and destination nodes for each user demand;

simulating routing of each demand over the existing two-node single path systems;

identifying all demands that can be exclusively routed over one of the existing single path two-node pairs;

recording any demand which can not be routed over an existing single path two-node pair;

modeling a new single path two-node pair system for each demand which cannot be routed;

determining whether routing the demand over the new single path system fails;

if the routing failed, determining if the demand is unfeasible and generating a report; and recording data representative of the new single path two-node pair system into a ring data structure of the SONET system if routing the demand was successful.

2. The method of claim 1 further comprising determining if the failure in routing was a result of the routed demand exceeded a predetermined number of hops, and in response, withdrawing the demand from further consideration.

3. The method of claim 1 further comprising determining a value representative of cost for each routed demand, and recording data representative of the least expensive path.

4. The method of claim 1 further comprising for each demand that is not routed, identifying all rings having both the destination node and the origin node present on the same ring, determining a minimum capacity needed to route existing demands and the future demand over each of ring having both the destination node and the origin node present on the same ring, and determining the least costly ring if the minimum capacity of more than one ring having both the destination node and the origin node present on the same ring is less than a total system capacity.

5. A method for generating optimized SONET rings based on an existing SONET system capacity and anticipated system demand comprising:

determining existing two-node single path systems present in the existing SONET system;

modeling the existing two-node single path systems;

determining origin and destination nodes for each user demand;

simulating routing of each demand over the existing two-node single path systems;

identifying all demands that can be exclusively routed over one of the existing single path two-node pairs;

recording any demand which can not be routed over an existing single path two-node pair;

modeling a new single path two-node pair system for each demand which cannot be routed;

determining whether routing the demand over the new single path system fails;

if the routing failed, determining whether the failure in routing was a result of the routed demand exceeding a predetermined number of hops, and in response, withdrawing the demand from further consideration; and recording data representative of the new single path two-node pair system into a ring data structure of the SONET system if routing the demand was successful.

6. The method of claim 5 further comprising determining a value representative of cost for each routed demand, and recording data representative of the least expensive path.

7. The method of claim 5 further comprising for each demand that is not routed, identifying all rings having both the destination node and the origin node present on the same ring, determining a minimum capacity needed to route existing demands and the future demand over each of ring having both the destination node and the origin node present on the same ring, and determining the least costly ring if the minimum capacity of more than one ring having both the destination node and the origin node present on the same ring is less than a total system capacity.

8. The method of claim 1 further comprising determining all possible ring interconnections combinations for routing a future year's demands in an earlier year by simulating routing of demands of a desired period having a predetermined start year through a predetermined end year in sequential order one year at a time.

9. The method of claim 8 further comprising for each year of the desired period, the demand year and actual year are used to establish possible ring interconnections.

10. The method of claim 8 further comprising creating a "bogus" network comprising a source node and a sink node created for all nodes, and a corresponding system created for all systems.

11. The method of claim 10 further comprising creating two ring nodes for each unidirectional system, with the capacity being set equal to a spare capacity of the unidirectional system.

12. The method of claim 10 further comprising creating a ring node for each node on a logical loop for each bi-directional system, with the capacity being set equal to a spare capacity of the original node.

13. The method of claim 12 further comprising:

creating a one-way edge from each ring node to a corresponding sink node, with the capacity being set equal to a spare capacity of the original node;

creating a two-way edge between each adjacent pair of ring nodes, with the capacity being equal to a spare capacity of the original link; and creating edges for all possible interconnections with the capacity of all edges being set as unlimited, and the cost of all interconnection edges being made equal to a corresponding user supplied interconnection cost.

* * * * *